United States Patent
Desai et al.

(10) Patent No.: US 6,266,757 B1
(45) Date of Patent: Jul. 24, 2001

(54) HIGH SPEED FOUR-TO-TWO CARRY SAVE ADDER

(75) Inventors: Mehul Desai, San Jose; Sudarshan Kumar, Fremont, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/074,019

(22) Filed: May 6, 1998

(51) Int. Cl.$^7$ ........................................... G06F 12/06
(52) U.S. Cl. ................................................. 711/220
(58) Field of Search ............................. 711/200, 214, 711/215, 220; 708/629, 630

(56) References Cited

U.S. PATENT DOCUMENTS 4,023,027 * 5/1977 Strathman et al. ............ 235/152
5,625,582 * 4/1997 Timko ............................ 364/786
5,818,747 * 10/1998 Wong ............................. 364/784.03
5,993,051 * 11/1999 Jiang et al. ..................... 364/748.07

OTHER PUBLICATIONS

Yee et al., "Clock–Delayed Domino For Adder and Combinational Logic Design", 1996, p. 332–337, IEEE.*

* cited by examiner

Primary Examiner—Kevin L. Ellis
(74) Attorney, Agent, or Firm—Blakely, Sokoloff, Taylor & Zafman LLP

(57) ABSTRACT

A circuit for adding two or more numbers and generating a sum and carry output is disclosed. The adder circuit receives two or more numbers to be added together. The adder circuit includes a number of exclusive-or logic circuits that generate intermediate outputs. The intermediate outputs are input to a domino multiplexer. The domino multiplexer includes a multiplexer gate and an exclusive-or gate connected in parallel. The domino multiplexer circuit outputs a sum value and a carry value for the input numbers. A clock signal drives the multiplexer gate and the exclusive-or gate in the domino multiplexer circuit. This clock signal synchronizes the input of the numbers to be added together and the addition operation in the domino multiplexer circuit.

14 Claims, 5 Drawing Sheets

HIGH SPEED FOUR-TO-TWO CARRY SAVE ADDER

FIELD OF THE INVENTION

The present invention relates generally to microprocessors, and more specifically to performing high speed add operations in an address generation unit.

BACKGROUND OF THE INVENTION

Instruction execution circuits within microprocessors include address generation units that decode addresses encoded within microprocessor instructions. The decoded addresses specify the locations in memory containing instructions to be executed or data to be accessed. Many present microprocessors feature advanced architectures that allow parallel processing and pipelined instruction execution. Such architectures allow microprocessors to decode, dispatch, and complete execution of (retire) multiple instructions in a single clock cycle. For example, in the Pentium® Pro microprocessor produced by Intel Corporation, a three-way superscalar, pipelined architecture allows for retirement of as many as three instructions per clock cycle. "Pentium" and "Pentium Pro" are registered trademarks of Intel Corporation of Santa Clara, Calif.

Parallel processing techniques and the use of fast temporary memory, such as caches for instructions and data, require extensive decoding of address information to generate proper memory locations from which to fetch instructions and data. For example, code that contains multiple levels of branches and procedure calls that allow for out-of-order instruction execution produce often complex address relationships that must be properly resolved for proper instruction execution. The use of traditional fixed addresses in such processing environments is often insufficient to execute modern complex code. Accordingly, most present microprocessors use dynamic address schemes in which addresses are provided through address components that are derived and combined to produce linear address values.

The generation of dynamic addresses requires extensive logic circuitry to decode addresses encoded within the processor instructions. Such circuitry includes adder circuits within the instruction execution units that calculate memory locations based on the encoded address information. As the speed of microprocessors increases, the speed of these adder circuits must also increase so that gate delays are minimized to ensure that addresses are generated fast enough to maintain high instruction cycle rates.

Present adder circuits typically use static combinatorial logic and multiplexer circuits to perform addition operations on address information. With present microprocessor speeds exceeding 200 MHz, and approaching 1000 MHz, these static logic output circuits introduce gate delays that often prevent the execution of multiple instructions during single clock cycles.

SUMMARY OF THE INVENTION

A circuit is disclosed for performing four input to two output carry save addition operations in an address generation unit of a microprocessor. An adder circuit receives two or more numbers to be added together. The adder circuit includes a number of logic circuits that generate intermediate outputs. The intermediate outputs are input to a domino multiplexer. The domino multiplexer includes a multiplexer gate and an exclusive-or gate connected in parallel. The domino multiplexer circuit outputs a sum value and a carry value for the input numbers. A clock signal drives the multiplexer gate and the exclusive-or gate in the domino multiplexer circuit. This clock signal synchronizes the input of the numbers to be added together and the addition operation in the domino multiplexer circuit.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A high speed adder circuit for use in a microprocessor address generation unit is described. In one embodiment of the present invention, four address component values are input to a plurality of exclusive-or circuits. Sum and carry output signals are generated by a domino-type multiplexer that forms the output stage of the adder circuit. The domino multiplexer is clocked to increase the speed of the address input operation and the generation of the sum and carry outputs.

It is an intended advantage of embodiments of the invention to minimize gate delays in the output stage of a multiple input adder circuit.

It is a further intended advantage of embodiments of the invention to provide a carry save adder circuit that calculates sum and carry values at a high speed in a microprocessor address generation unit.

Figure 1:
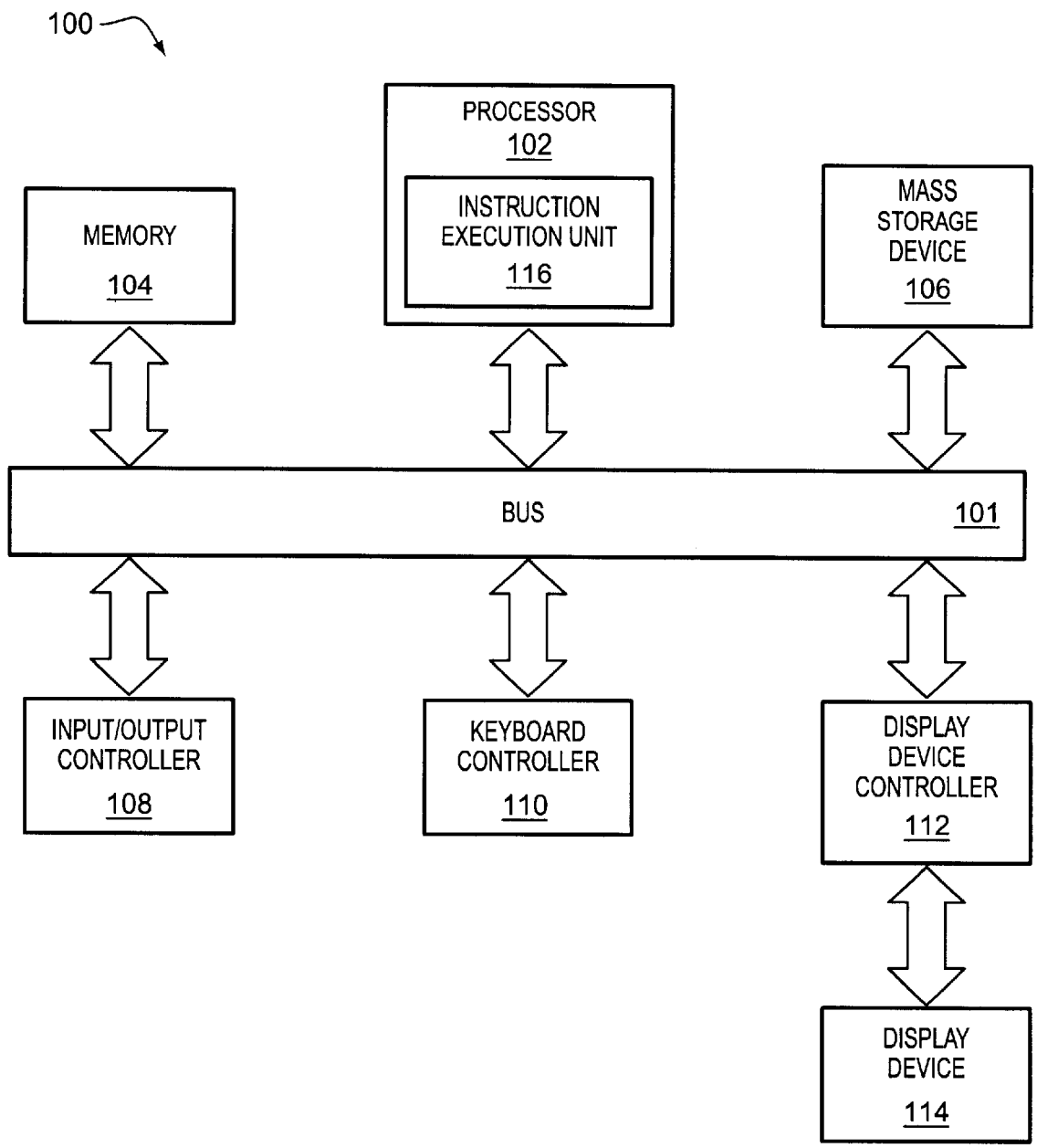
FIG. 1 is a block diagram of a computer system that includes an embodiment of the present invention.

FIG. 1 illustrates a block diagram of a computer system that incorporates embodiments of the present invention. The computer system 100 includes a processor 102 coupled through a bus 101 to a memory 104 and a mass storage device 106. In certain embodiments of the present invention, memory 104 is random access memory ("RAM"), read-only memory ("ROM"), or other non-volatile memory, such as flash memory; and mass storage device 106 is a large capacity persistent storage device, such as a hard disk drive, tape drive, or CD-ROM drive. A keyboard controller 110 is coupled to bus 101 for receiving commands or data entered through a keyboard, mouse, or similar input device. A display device controller 112 is also coupled to bus 101 to provide output through an appropriately coupled display device 114. Also coupled to bus 101 is an input/output controller 108 for interfacing processor 102 to other input/output devices, such as network interface devices, and the like.

In one embodiment of the present invention, processor 102 is a high-performance pipeline architecture processor that operates at a high clock speed. Processor 102 includes an instruction execution unit that implements parallel processing techniques to execute multiple code instructions in single clock cycles.

It should be noted that the architecture of FIG. 1 illustrates an exemplary computer system, and that a computer system that implements embodiments of the present invention is not limited to the specific architecture shown.

Figure 2:
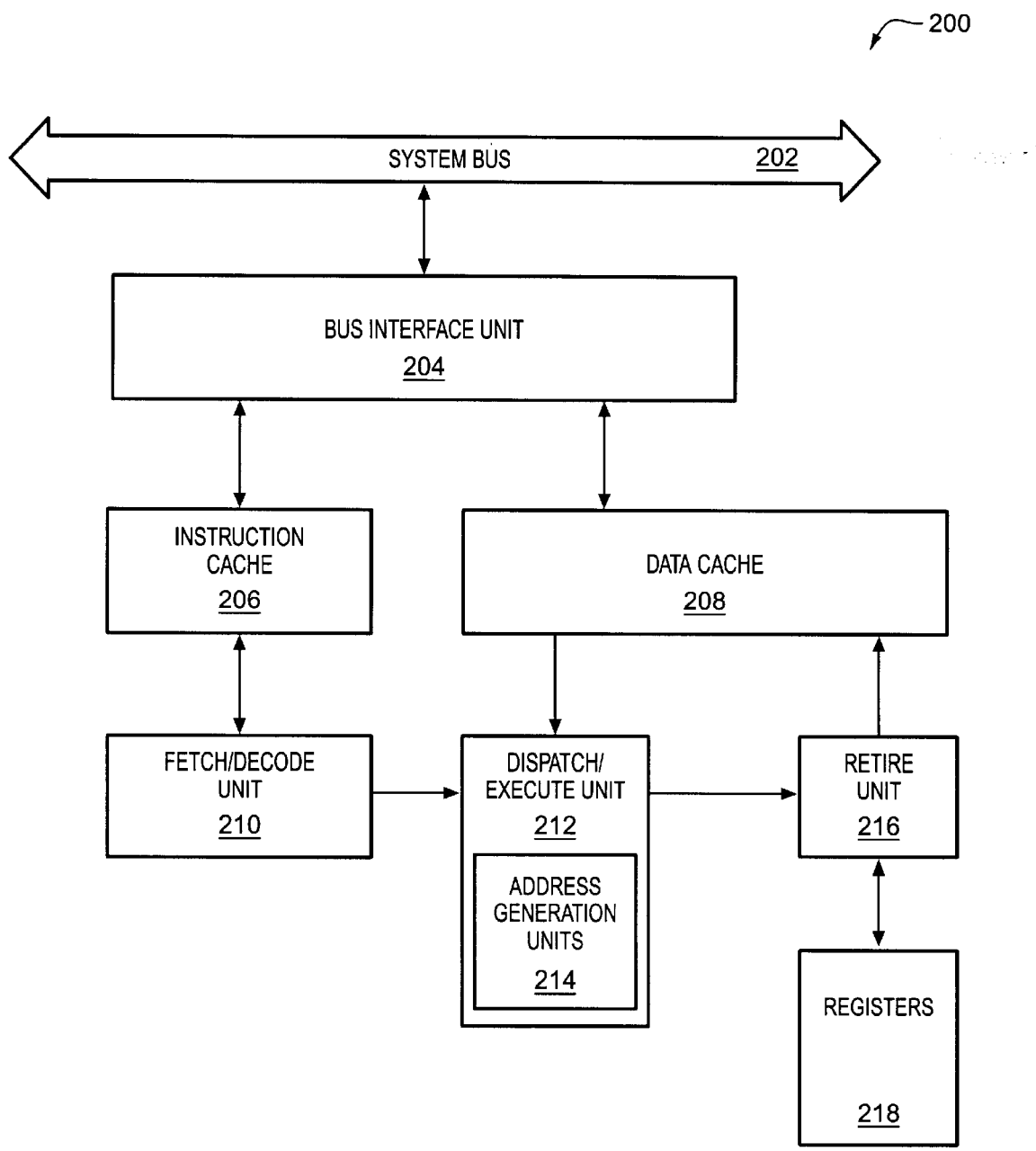
FIG. 2 is a block diagram of an instruction execution unit within a microprocessor that includes embodiments of the present invention.

FIG. 2 is a block diagram that illustrates major functional blocks within the instruction execution unit in processor 102, according to one embodiment of the present invention. Instruction execution unit 200 features a pipeline structure that facilitates dynamic instruction execution through execution of out-of-order instructions. Dynamic execution removes the constraint of linear instruction sequencing between traditional fetch and execute phases of instruction execution, and allows instructions to be decoded into multi-level branches to keep the instruction pipeline full.

Instruction execution unit 200 includes an instruction cache 206 and a data cache 208. Both caches may be of any size, but typically range from 8 KBytes (kilobytes) to 256 KBytes, and are typically implemented in static RAM (SRAM) devices. Instruction cache 206 temporarily stores last used or frequently used instructions for easy access by the execution units within the microprocessor. Similarly, data cache 208 temporarily stores last used or frequently used data values for easy access by the execution units.

The instruction and data caches are connected to system bus 202 through a bus interface unit 204. Bus interface unit 204 includes the necessary current drivers to propagate the instruction signals on the system bus 202. Instruction execution unit 200 includes fetch/decode unit 210. In one embodiment of the present invention, fetch/decode unit 210 includes an instruction fetch unit, instruction decoder, microcode sequencer, and related instruction execution circuits. The fetch/decode unit reads a stream of microprocessor instructions from instruction cache 206 and decodes them into a series of micro-operations. The resulting micro-operation stream is then sent to an instruction pool.

Connected to the fetch/decode unit 210 is dispatch/execute unit 212. In one embodiment of the present invention, dispatch/execute unit 212 includes arithmetic logic units and one or more address generation units 214. In one embodiment of the present invention, dispatch/execute unit 212 is an out-of-order unit that schedules and executes micro-operations stored in the instruction pool according to data dependencies and resource availability, and temporarily stores the results of these speculative executions.

In one embodiment of the present invention, the dispatch/execute unit 212 is connected to a retire unit 216. The retire unit 216 commits the results of speculatively executed micro-operations to permanent machine state, and removes the micro-operations from the instruction pool. Results of retired micro-operations are written to registers 218 or to memory. Registers 218 include a number of general purpose and floating point registers. In one embodiment of the present invention, retire unit 216 retires multiple micro-operations in a single clock cycle. For example, at a bus speed of 225 MHz, retire unit 216 is configured to retire three micro-operations per clock cycle.

Address generation unit 214 in dispatch/execute unit 212 generates the memory addresses needed to load and store instructions and data processed by instruction execution unit 200. Addresses are typically encoded in the micro-operations and must be decoded by the address generation unit for proper loading and storing of instructions and data. Although address generation unit 214 is shown in the context of an out-of-order instruction execution unit for a pipeline architecture microprocessor, it is to be noted that an address generation unit containing embodiments of the present invention may be implemented in linear addressing instruction execution units, as well.

Figure 3:
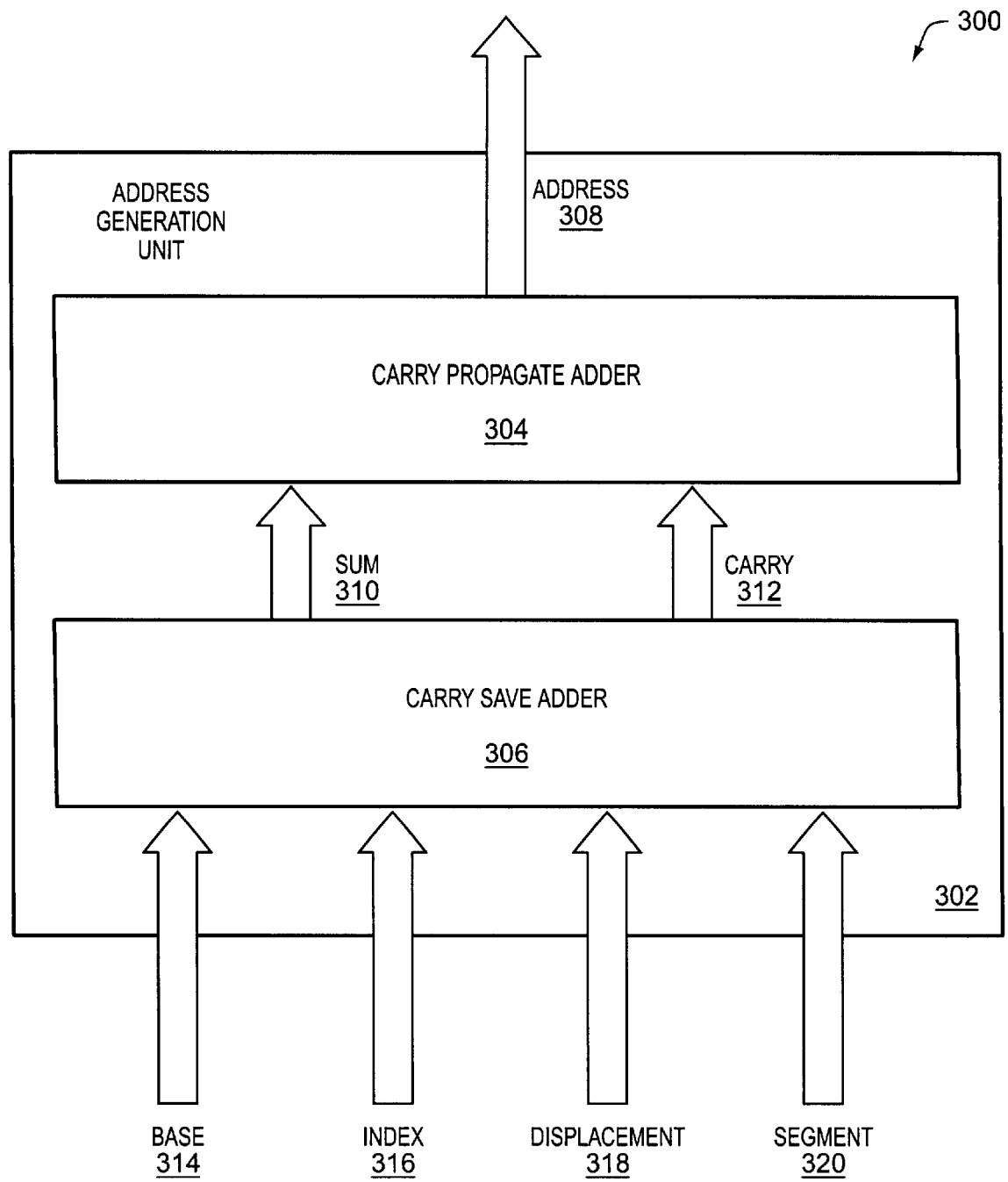
FIG. 3 is a block diagram of an address generation unit that includes a carry save adder according to one embodiment of the present invention.

FIG. 3 is a block diagram of an address generation unit according to one embodiment of the present invention. Address generation unit 302 includes a carry save adder 306 and a carry propagate adder 304 that provide actual memory locations over address bus 308 to one or more instruction execution units, such as instruction execution unit 200 in FIG. 2. In one embodiment of the present invention, carry save adder 306 receives four address components that are used to encode the actual memory address to be accessed by dispatch/execute unit 212 in FIG. 2. The addresses are typically encoded in micro-operations issued to the instruction execution unit. As illustrated in FIG. 3, the four address components input to carry save adder 306 are base 314, index 316, displacement 318, and segment 320. It should be noted that the specific address components and labels illustrated in FIG. 3 are intended to be exemplary, and that embodiments of the present invention may be used in address generations units that use different address components.

In one embodiment of the present invention, address generation unit 302 in circuit 300 is used in a microprocessor that organizes memory in a segmented memory mode. In contrast to a flat memory model, in which memory appears to a program as a single, continuous address space (linear address space), segmented memory appears to a program as a group of independent address spaces called segments. When using segmented memory, code, data, and stacks are typically contained in separate segments. To address a byte in a segment, a program must issue a logical address that consists of a segment selector and an address offset value. The segment selector identifies the segment to be accessed and the address offset identifies a byte in the address space of the segment. The logical addresses are translated into linear addresses for access by the processor. A segmented memory model increases the reliability of programs and systems by preventing overwriting of code and data space by different instructions.

The actual, or linear, address is generated by the address generation unit. The value of the linear address is produced by combining the base, index, displacement, and segment component values by a pre-determined relationship. In one embodiment of the present invention, the base value is stored in a general-purpose register and represents an indirect offset to an operand. The displacement is an 8-, 16-, or 32-bit value that is encoded in an instruction and represents a direct (uncomputed) offset to the operand. The index is stored in a general-purpose register and constitutes an offset to a location in an array pointed to by the displacement.

In one embodiment of the present invention, the linear address is determined by adding together the base, index, displacement, and segment component values. Thus, the actual address is determined by the following equation:

Linear Address=Base+Index+Displacement+Segment

In an alternative embodiment of the present invention, the index is multiplied by a scale value of 2, 4, or 8, and is encoded in the instruction. The value of the scale corresponds to the size of the elements in an array located by the displacement. In this alternative embodiment, the linear address is determined by the following equation:

Linear Address=Base+(Index×Scale)+Displacement+Segment

In Address Generation Unit 302, carry save adder 306 combines the four address components to produce a sum 310 and carry 312 value. The sum and carry values are added together in carry propagate adder 304 to produce address 308 that is output on the address bus.

Figure 4:
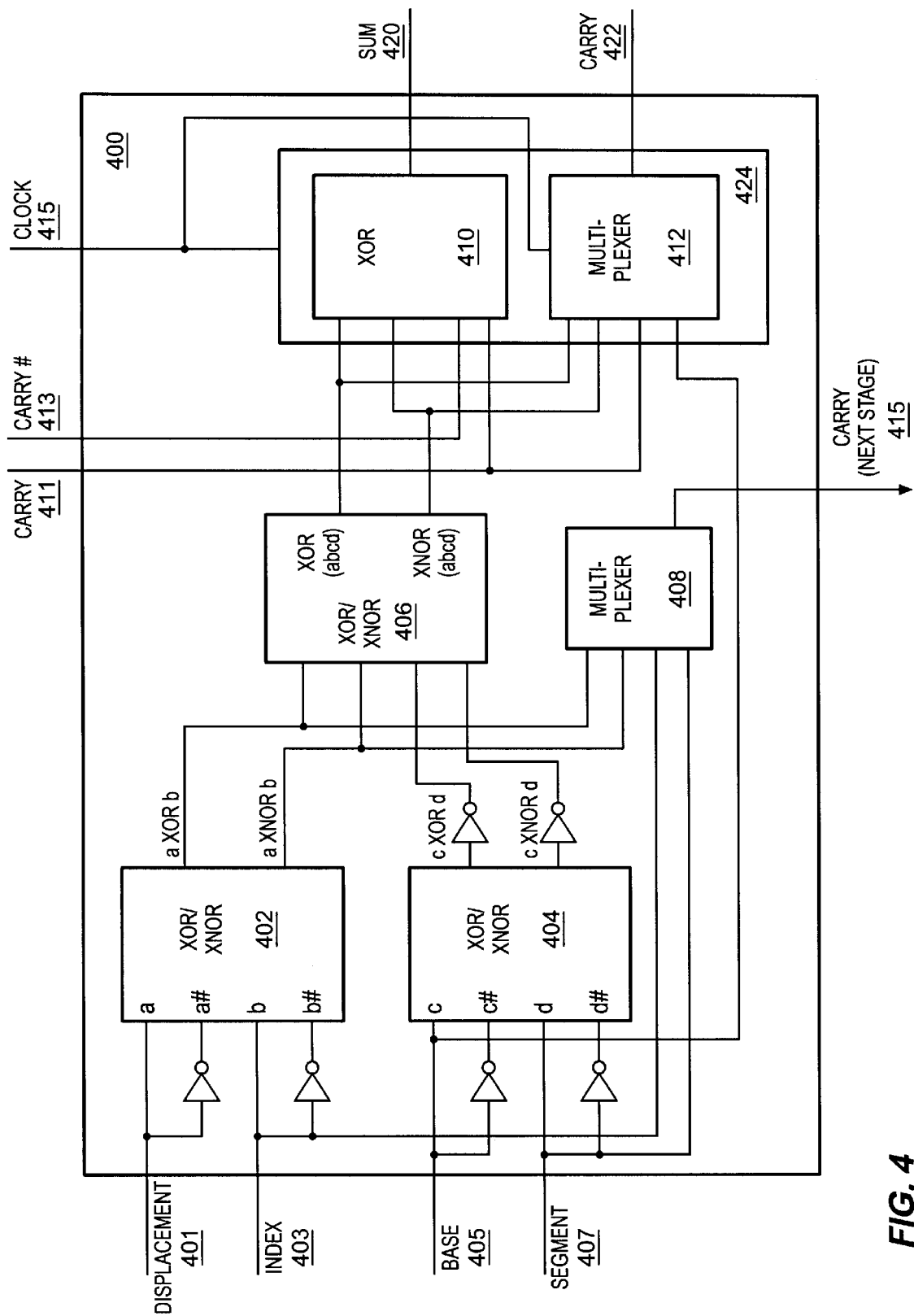
FIG. 4 is a block diagram of a carry save adder circuit with a domino multiplexer output stage according to one embodiment of the present invention.

To ensure execution of instructions in step with the speed of the microprocessor, gate delays in the circuits comprising the carry save adder and carry propagate adders must be minimized. FIG. 4 is a circuit diagram that illustrates the composition of a carry save adder according to one embodiment of the present invention. In one embodiment of the present invention, carry save adder circuit 400 represents one stage of a multiple-stage adder circuit. For a 32-bit address bus, an address generation unit contains 32 separate carry-save adders, each similar to the carry save adder circuit of FIG. 4. These separate adder circuits are connected in a cascade arrangement such that internal carry values are carried from each stage to a successive stage to maintain an overall sum for the entire address generation unit.

In one embodiment of the present invention, carry save adder circuit 400 is a four-to-two (4:2) adder that adds four inputs to produce sum and carry outputs. As illustrated in FIG. 4, carry save adder 400 adds together the input address components of displacement 401, index 403, base 405, and segment 407 values to produce sum 420 and carry 422 outputs. In alternative embodiments of the present invention, the actual order of the input address components may be different. In general, the actual order of the input address components is not significant and may be varied, since addition is a commutative operation (i.e., a+b+c+d=d+c+b+a).

In the embodiment of the present invention illustrated in FIG. 4, the displacement 401 and index 403 values, and their respective inverted signals are combined in a two-to-one exclusive-or/exclusive-nor (XOR/XNOR) circuit 402. XOR/XNOR circuit 402 produces two output signals corresponding to the exclusive-or of the two input signals, and the exclusive-nor of the two input signals. The base 405 and segment 407 values, and their respective inverted signals are combined in two-to-one XOR/XNOR circuit 404. As with circuit 402, XOR/XNOR circuit 404 produces two output signals corresponding to the exclusive-or of the two input signals, and the exclusive-nor of the two input signals. The output signals from XOR/XNOR circuits 402 and 404 are input to two-to-one XOR/XNOR circuit 406. XOR/XNOR circuit 406 produces two output signals. The first output is the exclusive-or of the input signals, i.e., (a xor b xor c xor d), where a, b, c, and d denote the input signals; and the second output is the complement of the first output.

The two output signals from XOR/XNOR circuit 406 are input to a domino multiplexer circuit 424. Domino multiplexer 424 includes an XOR gate 410 and a multiplexer 412. The two XOR/XNOR circuit 406 output signals are input to XOR gate 410 and multiplexer 412 in domino multiplexer 424. The two remaining inputs to XOR 410 are carry 411 and inverse carry 413 (carry#) signals from previous carry add stages. The two remaining inputs to multiplexer 412 are the carry signal 411 from the previous carry add stage, and the base value 405. The XOR and XNOR output signals from XOR/XNOR circuit 406 act as control signals to multiplexer 412. The values of these control signals determines which of the input signals, carry 411, or base 405 is output from multiplexer 412.

From domino multiplexer 424, XOR gate 410 outputs a sum value 420, and multiplexer 412 outputs a carry value 422. Together, the sum 420 and carry 422 values represent the result of the addition of the four address components 401, 403, 405, and 407.

In one embodiment of the present invention, domino multiplexer 424 is a clocked circuit that receives clock signal 415 to the clock input of both XOR gate 410 and multiplexer 412. Input of a dedicated clock signal 415 to the domino multiplexer 424 allows the addition operation executed in carry save adder 400 to be synchronized by an internal clock signal rather than clocked by a downstream carry propagate adder (e.g., carry propagate adder 304), or other external circuit. Thus, input of the four address components is driven by the domino multiplexer clock. Such internal clocking provides a distinct stage demarcation that imposes strict time constraints on the input signals. Moreover the use of a synchronous domino multiplexer allows the use of a higher speed device than a simple static multiplexer as the output stage of the carry save adder.

In one embodiment of the present invention, the two output signals from XOR gate 402 and the index 403 and segment 407 signals are input to multiplexer 408. Multiplexer 408 is a two-to-one multiplexer circuit that outputs a carry value 415 to the next successive adder circuit in the address generation unit containing carry add circuit 400.

Figure 5:
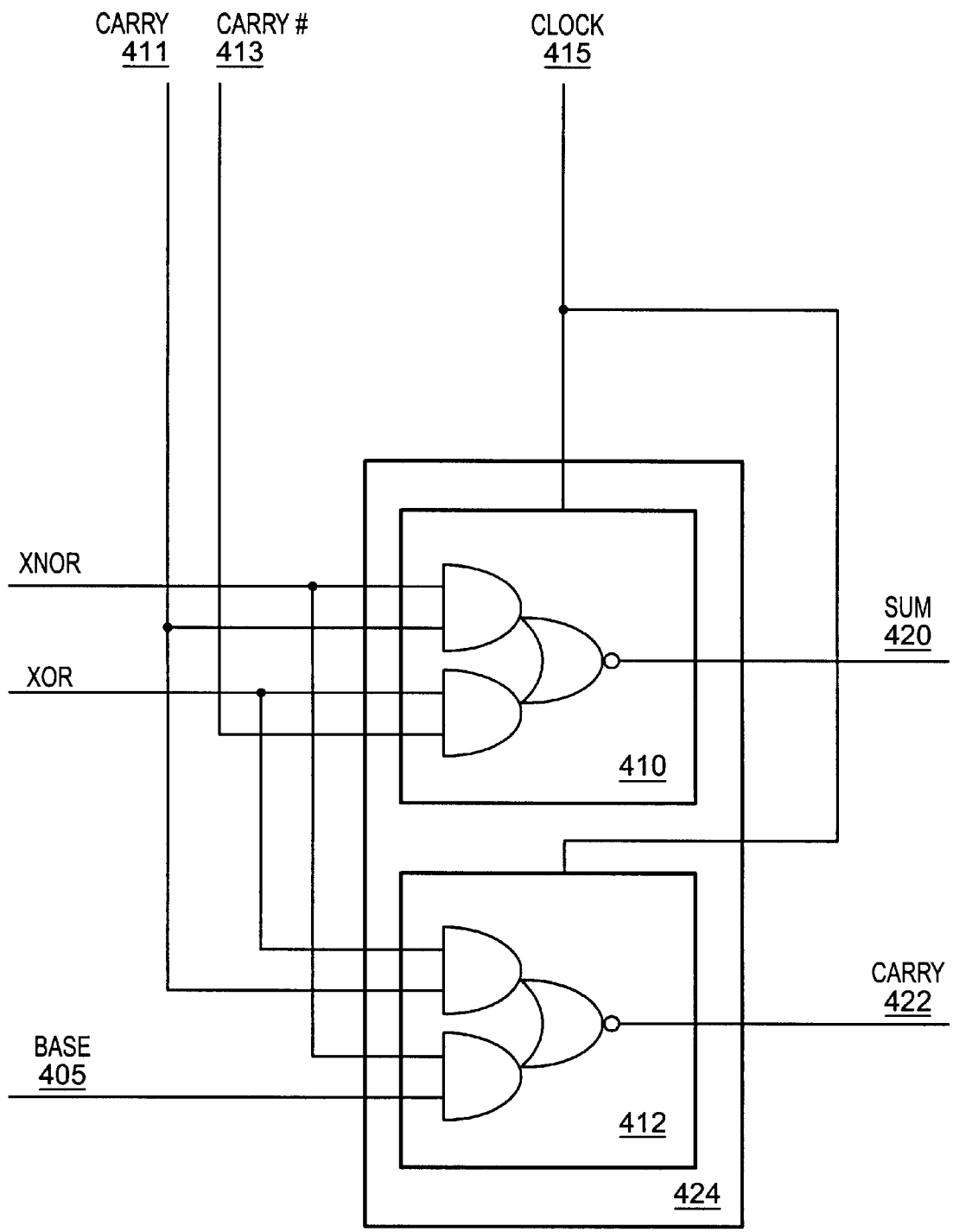
FIG. 5 is a circuit diagram of a domino multiplexer output stage used in the carry save adder circuit of FIG. 4, according to one embodiment of the present invention.

FIG. 5 is a circuit diagram of a domino multiplexer output stage used in the carry save adder circuit of FIG. 4, according to one embodiment of the present invention. In domino multiplexer 424, XOR gate 410 includes two two-input AND gates coupled to a NOR gate. The two AND gates combine the outputs from XOR/XNOR circuit 406 in FIG. 4 with the carry 411 and carry# 413 signals from a preceding stage. NOR gate in XOR gate 410 then outputs the sum value.

Similarly, multiplexer 412 includes two two-input AND gates coupled to a NOR gate. The two AND gates combine the outputs from XOR/XNOR circuit 406. These signals act as multiplexer control signals that select between the base 405 and carry 411 signals that are also input to the two AND gates. The NOR gate in multiplexer 412 then outputs the carry value. Both XOR 410 and multiplexer 412 in domino multiplexer 424 receive clock signal 415 that synchronizes the logic functions of the gates in these circuits.

In alternative embodiments of the present invention, different combination of logic gates or programmable logic circuits may be used to implement the XOR 410 and multiplexer 412 circuits within domino multiplexer 424.

Although the carry save adder circuit illustrated in FIG. 4 has been shown and discussed as being implemented in an address generation unit for use in an instruction execution unit within a microprocessor, it should be understood that adder circuits according to embodiments of the present invention can be used in many other types circuits in which four values are input and a sum and carry value are output.

In the foregoing, a circuit has been described for performing addition operations on multiple input address components in an address generation unit. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A circuit comprising:
    a plurality of input terminals, each input terminal of said plurality of input terminals operable to receive a number to be added;
    a plurality of logic circuits coupled to said plurality of input terminals, each logic circuit of said plurality of logic circuits operable to generate one or more intermediate outputs corresponding to exclusive logic relationships between corresponding input numbers;
    a multiplexer circuit coupled to said plurality of logic circuits, and operable to receive said intermediate outputs and to generate a sum value and a carry value for numbers input on said input terminals; and
    a multiplexer clock signal coupled to said multiplexer circuit and operable to synchronize logic functions of said multiplexer circuit.

2. The circuit of claim 1 wherein said multiplexer circuit comprises a clocked two input one output exclusive-or gate coupled to a clocked two input one output multiplexer gate, and wherein said exclusive-or gate outputs said sum value and said multiplexer gate outputs said carry value.

3. The circuit of claim 2 wherein said plurality of input terminals comprises four input terminals.

4. The circuit of claim 3 wherein said circuit comprises an adder circuit used in an address generation unit of a microprocessor, and wherein each number to be added comprises a component of a memory address accessible by said microprocessor.

5. The circuit of claim 4 wherein,
    a first number input on one of said input terminals comprises a base component of said memory address;
    a second number input on one of said input terminals comprises a displacement value component of said memory address;
    a third number input on one of said input terminals comprises an index value component of said memory address; and
    a fourth number input on one of said input terminals comprises a segment value component of said memory address.

6. A carry add circuit for adding a plurality of numbers, said carry add circuit comprising:
    a plurality of exclusive-or gates operable to receive said plurality of numbers and to generate intermediate output signals representing a compound exclusive-or relationship among said plurality of numbers; and
    a domino multiplexer circuit coupled to said plurality of exclusive-or circuits and to a clock signal, said domino multiplexer operable to generate a sum output and a carry output for said plurality of numbers based on said intermediate output signals and a carry signal from an external circuit.

7. The carry add circuit of claim 6 wherein said clock signal synchronizes generation of said sum output and said carry output, and processing of said plurality of numbers in said plurality of exclusive-or gates.

8. The carry add circuit of claim 7 wherein said domino multiplexer circuit comprises a multiplexer gate coupled in parallel to an exclusive-or/exclusive nor gate.

9. The carry add circuit of claim 8 wherein said exclusive or/exclusive nor gate outputs said sum signal and said multiplexer gate outputs said carry signal.

10. The carry add circuit of claim 9 wherein said plurality of numbers comprises components of a memory address.

11. An address generation unit comprising:
    an input circuit operable to receive a plurality of address components; a carry propagate adder coupled to said input circuit and operable to output an address determined by said plurality of address components; and
    a carry save adder coupled between said carry propagate adder and said input circuit, and operable to input in an input operation and combine in an add operation, said plurality of address components, and generate a sum and carry for input to said carry propagate adder; and wherein said input operation and said add operation are synchronized to a clock signal input to said carry save adder.

12. The address generation unit of claim 11 wherein said plurality of address components comprises a base value, a displacement value, an index value, and a segment value.

13. A circuit comprising:
    a plurality of input terminals;
    a first exclusive-or circuit coupled to a first pair of said plurality of input terminals;
    a second exclusive-or circuit coupled to a second pair of said plurality of input terminals;
    a third exclusive-or circuit coupled to outputs of said first exclusive-or circuit and said second exclusive-or circuit; and
    a domino multiplexer circuit coupled to said third exclusive-or circuit and to a clock signal, said clock signal synchronizing logic functions of said multiplexer circuit.

14. The circuit of claim 13 wherein said domino multiplexer circuit comprises a fourth exclusive-or circuit coupled in parallel to a multiplexer gate.

* * * * *